(12) United States Patent
K.

(10) Patent No.: US 8,285,822 B2
(45) Date of Patent: Oct. 9, 2012

(54) POLICY CONFIGURATION AND SIMULATION

(75) Inventor: Chandrashekar K., Bangalore (IN)

(73) Assignee: Novell, Inc., Provo, UT (US)

( * ) Notice: Subject to any disclaimer, the term of this patent is extended or adjusted under 35 U.S.C. 154(b) by 351 days.

(21) Appl. No.: 12/604,738

(22) Filed: Oct. 23, 2009

(65) Prior Publication Data

US 2011/0099603 A1    Apr. 28, 2011

(51) Int. Cl.
G06F 15/177 (2006.01)
G06F 15/173 (2006.01)
G06F 17/00 (2006.01)

(52) U.S. Cl. ............................. 709/220; 709/223; 726/1
(58) Field of Classification Search .................. 709/220, 709/223; 726/1
See application file for complete search history.

(56) References Cited

U.S. PATENT DOCUMENTS

| | | | |
|---|---|---|---|
| 5,764,911 A * | 6/1998 | Tezuka et al. ................. | 709/223 |
| 5,999,179 A * | 12/1999 | Kekic et al. .................... | 715/734 |
| 6,209,036 B1 | 3/2001 | Aldred et al. | |
| 6,581,093 B1 | 6/2003 | Verma | |
| 7,031,967 B2 | 4/2006 | Cheng et al. | |
| 7,107,595 B2 | 9/2006 | Sanchez, II et al. | |
| 7,136,916 B2 * | 11/2006 | Schade .......................... | 709/223 |
| 7,143,153 B1 * | 11/2006 | Black et al. ................... | 709/223 |
| 2001/0039549 A1 | 11/2001 | Eng et al. | |
| 2005/0125697 A1 * | 6/2005 | Tahara ........................... | 713/201 |
| 2006/0155777 A1 | 7/2006 | Shih et al. | |
| 2008/0104087 A1 | 5/2008 | Rowley et al. | |
| 2009/0210541 A1 | 8/2009 | Chandolu | |

* cited by examiner

Primary Examiner — Ranodhi Serrao

(74) Attorney, Agent, or Firm — Schwegman, Lundberg & Woessner, P.A.

(57) ABSTRACT

Techniques for policy configuration and simulation are presented. A graphical user interface (GUI) permits a user to visualize network resources and their relationships to one another. The user can select a resource and receive another view within the GUI to see policies for that resource and relationships between the policies. The user can also select a particular policy and alter its configuration. The altered configuration can then be simulated within the network and the results presented back to the user within the GUI.

9 Claims, 7 Drawing Sheets

POLICY CONFIGURATION AND SIMULATION

BACKGROUND

Enterprises now organize and store information across a wide variety of physical facilities. Employees no longer work at single locations for a single enterprise. Moreover, employees have devices and network capabilities to remotely log into an enterprise's network from virtually anywhere across the globe using a plethora of different devices.

All this increased accessibility and mobility require more administration and security than what has been available in the past. To make administration easier directory services are often deployed by enterprises. These directory services logically represent enterprise assets, such as users, machines, files, etc. Tools and Application Programming Interfaces (API's) provide the ability for administrators to assign asset attributes that define security and other actions that are permissible on those assets. Such abilities allow for automated support and maintenance, which reduce support staff and corresponding expenses of the enterprises.

Some visualization tools permit graphical viewing a network tree that shows the hierarchical nature of an enterprise's assets. These tools have limited capabilities and often separate tools or API's not fully integrated with the visualization tools are needed for modifying the attributes of the enterprise assets. That is, a series of tools are needed for efficient maintenance.

In addition, when administrators want to test new actions or attributes for enterprise assets, such testing usually occurs in a mirrored testing environment where the tools are duplicated and separately maintained. In many cases, separate machines are used in the testing environments. These circumstances add to an enterprise's support staff, equipment, and maintenance (for supporting dual versions of the directory API's and tools).

Thus, what are needed are improved techniques for policy configuration and stimulation.

SUMMARY

In various embodiments, techniques for policy configuration and simulation are presented. More specifically, and in an embodiment, a method for policy configuration and simulation is provided. More specifically, a graphical user interface (GUI) is presented to a user for policy configuration and simulation of a network. The network resources are represented within the GUI as interconnected nodes; each connection between two particular nodes defining a relationship between those two particular nodes. Finally, the user is permitted to selectively activate the nodes to configure policies for particular relationships and to simulate the configured policies against the selectively activated nodes.

DETAILED DESCRIPTION

Figure 1:
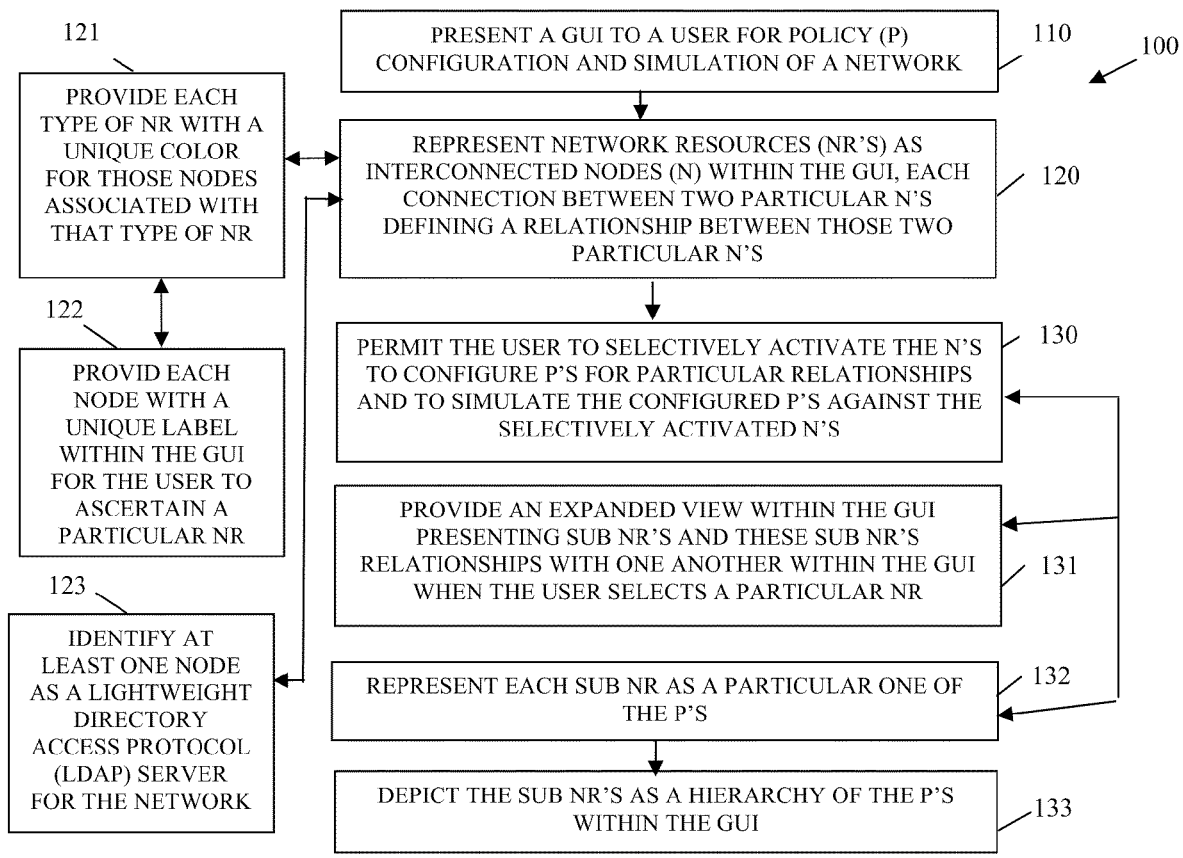
FIG. 1 is a diagram of a method for policy configuration and simulation, according to an example embodiment.

As used herein a "network resource" refers a user, a processing device (a machine having one or more processors and memory, such as a client, server, peripheral device, etc.), an automated service that processes as instructions on a processing device, groups of users, etc. Network resources are authenticated via an "identity" for access to secure network services.

A "secure network" is one that requires authentication to access and that may or may not use encryption for communication to and within the secure network.

A "node" is a logical representation of a network resource within a graphical user interface (GUI). Nodes are connected via relationships. A relationship is logically represented as a line within the GUI or other visual depiction as discussed herein and below. A "relationship" is a type of connection and attributes associated with that connection between two nodes. It is noted that nodes are also network resources and can represent pieces of data or information. The nodes are configured by clicking on them or selecting them in the manners discussed herein and below.

A node is activated within the GUI by selection device of a user, such as a mouse, a digital pen, wand, or a finger when the display presenting the GUI is touch-screen enabled. Activation is more than a selection. For example, when the selection device is a mouse, a double click of the mouse on the node activates the node. Conversely, a node can be selected by bringing that node into focus or highlighting it with the selection device. For example, when the selection device is a mouse, a single click of the mouse on the node selects the node or brings it into focus but does not activate the node within the GUI. It is noted that sometimes users can custom configure their selection devices, such that a single mouse click can produce activation and a mere mouse over without a click can select or bring a node into focus. The point is there are two types of user actions to take action on a node, one is to activate the node and another is to simply select and bring that node into focus within the GUI.

A "policy" is one or more conditional statements that when evaluated to true perform one or more actions associated with those conditional statements. For example, a policy may be "if user X is using machine Y, then access to resource Z is to be set to read only" Here, X, Y and Z are unique identities for network resources X (user), Y (machine) and Z (resource, such as a database). Again, this example was presented for purposes of illustration only. Any customized or enterprise defined conditions assigned to actions can be embodied within a computer-readable storage medium and enforced as a policy evaluation on a processing device that is configured to evaluate that policy.

A "configuration" refers to the specific values or conditions that are used to define or set a particular policy. So, a specific set of values that define the conditions and actions for a particular policy is a configuration for that specific policy.

Connections may also represent policies (condition path to reach a particular resource) in a server's policy tab within a GUI (as presented herein and below). These same connections also represent the configuration (drivers or calls for configuration to access the resources, so the driver needs the resource configuration to address the resource, to control the resource being address policies are used, which consume the configuration data, when the policy is executed an appropriate resource is chosen; in some cases the resources are directly connected with the resource where thee is no choice the flow would either pass if the condition leads to true or blocks if the condition leads to false) in the server configuration tab for the GUI (as presented herein and below).

An identity is authenticated via various techniques (e.g., challenge and response interaction, cookies, assertions, etc.) that use various identifying information (e.g., identifiers with passwords, biometric data, hardware specific data, digital certificates, digital signatures, etc.). A "true identity" is one that is unique to a principal across any context that the principal may engage in over a network (e.g., Internet, Intranet, etc.). However, each principal may have and manage a variety of identities, where each of these identities may only be unique within a given context (given service interaction, given processing environment, given virtual processing environment, etc.).

According to an embodiment, the techniques presented herein are implemented in proxy-server products, directory-based products, storage-access based products, and/or operating-system products, distributed by Novell, Inc. of Provo, Utah.

Of course, the embodiments of the invention can also be implemented in a variety of products and/or devices. Any particular architectural layout or implementation presented herein is provided for purposes of illustration and comprehension only and is not intended to limit various aspects of the invention.

It is within this initial context, that various embodiments of the invention are now presented with reference to the FIGS. 1-7.

FIG. 1 is a diagram of a method 100 for policy configuration and simulation, according to an example embodiment. The method 100 (hereinafter "configuration and simulation service") is implemented as instructions in a machine-accessible and/or computer-readable storage medium. The instructions when executed by a machine (processing device (device having one or more processors and memory), computer, etc.) perform the processing depicted in FIG. 1. The configuration and simulation service is also operational over and processes within a communication network. The communication network may be wired, wireless, or a combination of wired and wireless.

In some cases, the processing device (one or more processors) is specifically configured to execute the instructions representing the configuration and simulation service. The GUI is presented to the user for purposes of adding, deleting, and/or configuring the network resources (nodes) as well as for purposes of configuring the policies (relationships and connections).

At 110, the configuration and simulation service presents a graphical user interface (GUI) tool to a user. The GUI tool may be referred to herein as a Modeler or a Modeler Editor. The GUI is presented to the user for purposes of permitting the user to perform custom policy configuration and simulation of those policies on network resources of a network.

At 120, the configuration and simulation service represents network resources as interconnected nodes within the GUI. Each connection between any two particular nodes defines a relationship between those two particular nodes. The relationships are the policies defining the connection and/or attributes associated with the connection. Network resources (nodes) and Relationships (connections) can also have either image (such as an icon), color text, and/or label to uniquely identify them.

According to an embodiment, at 121, the configuration and simulation service provides each type of network resource with a unique color for those nodes associated with that type of network resource. So, the user can visually and readily ascertain from the GUI different types of network resources, such as users, groups of users, data resources, machines, peripherals, etc.

Continuing with the embodiment of 121 and at 122, the configuration and simulation service provides each node with a unique label within the GUI for the user to ascertain a particular network resource. In some cases, the label provides a textual indication as to an identity for the particular network resource. So, not only are different types of nodes color coded by each node includes a unique label so that the user can readily ascertain not only the type of network resource represented by a node within the GUI but also ascertain an identity for each network resource via a text label provided with the node.

In an embodiment, at 123, the configuration and simulation service identifies at least one node as a Lightweight Directory Access Protocol (LDAP) server for the network. So, one type of network resource is a LDAP server used from directory management by an enterprise.

At 130, the configuration and simulation service permits the user to interact with the nodes depicted in the GUI. This allows the user to selectively activate the nodes (representing network resources) for purposes of configuring policies for particular relationships (connections between nodes (network resources)). This also permits the user to simulate, via the configuration and simulation service, the configured policies against the selectively activated nodes.

According to an embodiment, at 131, the configuration and simulation service provides an expanded view within the GUI that presents sub network resources (other nodes in the expanded vie of the GUI) and these sub network resources' relationships with one another within the GUI when the user selects a particular network resource. In other words, when a node is activated, the sub nodes (representing policies for that node) are shown along with the connection relationships that the policies related to.

In another case, at 132, the configuration and simulation service represents each sub network resource as a particular one of the policies.

Continuing with the embodiment of 132 and at 133, the configuration and simulation service depicts the sub network resources as a hierarchy of the policies within the GUI.

Example visual aspects of the GUI when the user selects the nodes and configures the policies are shown below with reference to the FIGS. 4-7.

Figure 2:
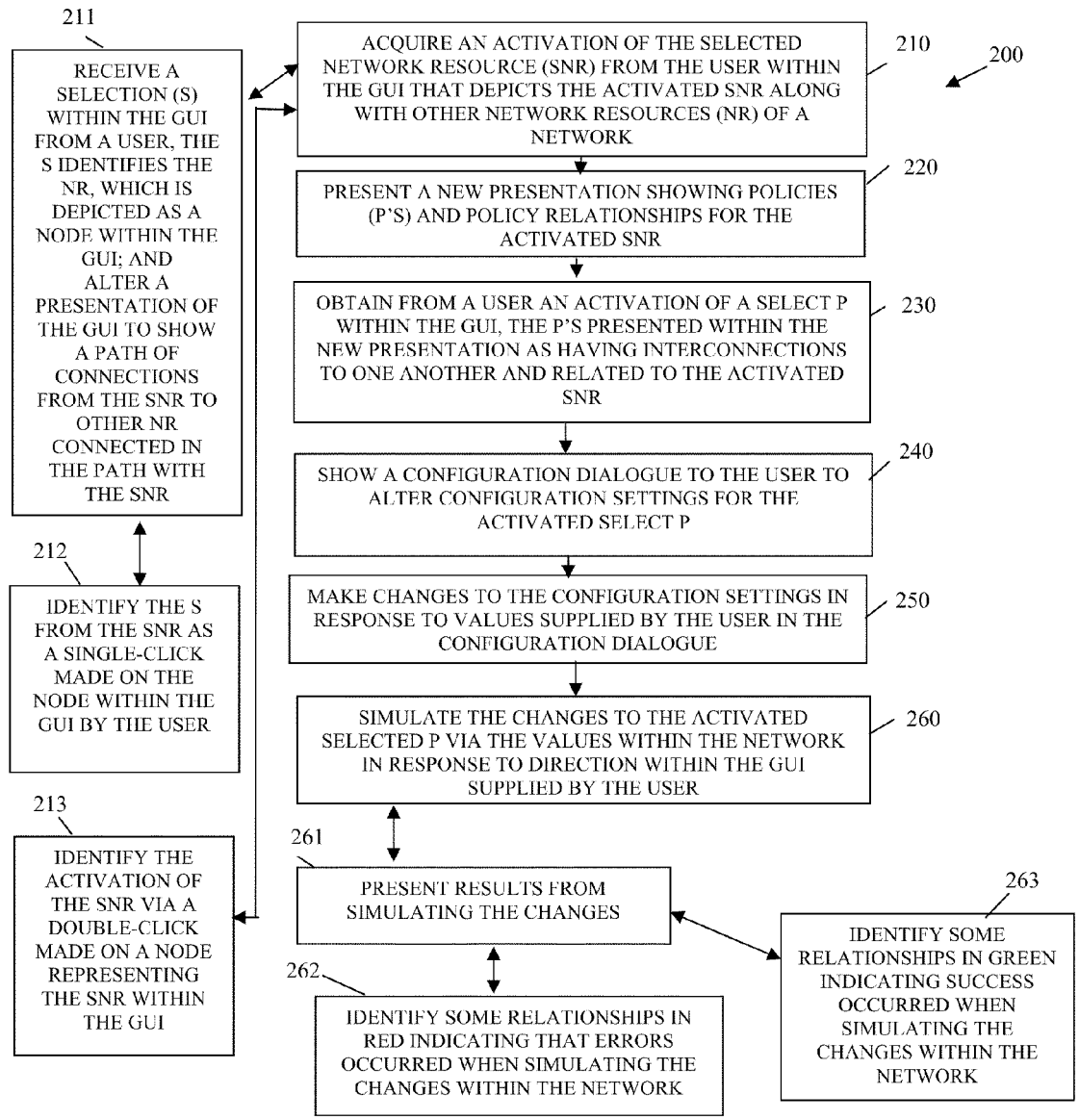
FIG. 2 is a diagram of another method for policy configuration and simulation, according to an example embodiment.

FIG. 2 is a diagram of another method 200 for policy configuration and simulation, according to an example embodiment. The method 200 (herein after referred to as "network modeling service") is implemented in and resides within a machine-accessible and computer-readable storage medium as instructions, which when processed by a machine (one or more processors, etc.) performs the processing depicted in the FIG. 2. The network modeling service is also operational over a communication network. The network is wired, wireless, or a combination of wired and wireless.

The network modeling service represents another and in some cases enhanced perspective of the configuration and simulation service presented in detail above with respect to the method 100 for the FIG. 1.

At 210, network modeling service acquires an activation of the selected network resource from a user within a GUI. The GUI depicts the activated selected network resource along with other network resources of a network, which depicts the possibilities after applying the policies; similar to a partial simulation.

According to an embodiment, at 211, the network modeling service receives a selection within the GUI from the user.

The selection identifies the network resource, which is depicted as a node within the GUI. Also, the network modeling service alters a presentation of the GUI to show a path of connections from the selected network resource to other network resources connected in the path with the selected network resource. A visual depiction of this scenario is presented below with reference to the FIGS. 5-7.

Continuing with the embodiment of 211 and at 212, the network modeling service identifies the selection from the selected network resource as a single-click made on the node within the GUI by the user.

In another cases, at 213, the network modeling service identifies the activation of the selected network resource via a double-click made on a node representing the selected network resource within the GUI. This is a node activation that alters the presentation as discussed above.

At 220, the network modeling service presents a new presentation showing policies and policy relationships for the activated selected network resource.

At 230, the network modeling service obtains from a user an activation of a select policy within the GUI. The policies presented within the new presentation have interconnections to one another and are related to the activated selected network resource.

At 240, the network modeling service shows a configuration dialogue to the user to alter configuration settings for the activated select policy.

At 250, the network modeling service makes changes to the configuration settings in response to values supplied by the user in the configuration dialogue. Here, the user has made changes to the selected policy, changes by way of changes in values for the original policy, such as conditions and/or actions.

At 260, the network modeling service simulates the changes to the activated and selected policy via the values within the network in response to direction within the GUI that is supplied by the user. So, the user supplies the values for the changes that the network modeling service uses to then simulate the changed policy configuration within the network.

According to an embodiment, at 261, the network modeling service presents results from simulating the changes within the GUI for the user to see.

In one case, at 262, the network modeling service identifies some relationships in red. The red color indicating that errors occurred when simulating the changes within the network.

In another cases, at 263, the network modeling service identifies some relationships in green indicating success occurred when simulating the changes within the network.

It is noted that the simulation results may include the embodiments of both 262 and 263 within the GUI simultaneously. Thus, some relationships are in red and other relations are shown in green. The red showing failures and the green showing success.

Figure 3:
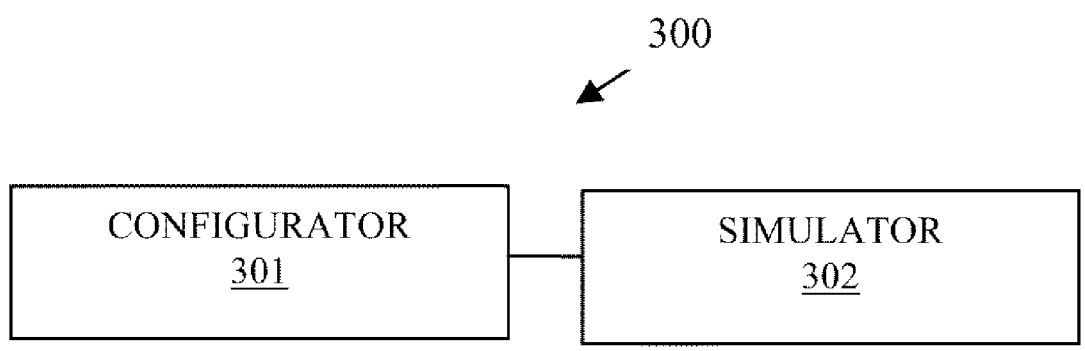
FIG. 3 is a diagram of a policy configuration and simulation system, according to an example embodiment.

FIG. 3 is a diagram of a policy configuration and simulation system 300, according to an example embodiment. The policy configuration and simulation system 300 is implemented as instructions on one or more processing devices. These processing devices are specifically configured to process the policy configuration and simulation system 300. The policy configuration and simulation system 300 is also operational over a communication network. The communication network is wired, wireless, or a combination of wired and wireless.

In an embodiment, the policy configuration and simulation system 300 implements, among other things, the methods 100 and 200 of the FIGS. 1 and 2, respectively.

The policy configuration and simulation system 300 includes a configurator 301 and a simulator 302. Each of these and their interactions with one another are now discussed in turn.

The configurator 301 is implemented in a computer-readable storage medium and executes on the one or more processors of a network. Example processing associated with the configurator 301 was discussed in detail above with reference to the method 100 of the FIG. 1.

The configurator 301 interacts with one or more screens of a GUI accessed by a user and the configurator 301 is configured to accept value changes from configuration settings of policies. The policies are graphically presented in the GUI. Moreover, the configurator 301 is also configured to provide the value changes to the simulator 302.

In an embodiment, the configurator 301 is also configured to be activated from a dialogue box after a user selects a particular policy from a particular network resource. The particular policy is selected by the user from modification or alteration with respect to its configuration settings.

In yet another situation, the configurator 301 is configured to enforce security against the value changes to ensure that the user has proper access rights to make the value changes provided by the user.

Similarly, the configurator 301 is configured to provide a listing of acceptable values from the user to select when providing the value changes.

The simulator 302 is implemented in a computer-readable storage medium and executes on the one or more processors of the network. Example processing associated with the simulator 302 was discussed in detail above with reference to the method 200 of the FIG. 2.

The simulator 302 is configured to process the value changes and present results of those value changes to the user within the GUI.

According to an embodiment, the simulator 302 is configured to alter presentations within the GUI to depict the results for the user.

Continuing with the previous embodiment, the simulator 302 is also configured to uniquely provide visual cues where results fail and succeed within the presentations.

FIGS. 4-7 depict example screen shots of a Graphical User Interface (GUI) manipulated, processed, and used by the methods 100 and 200 represented by the FIGS. 1 and 2, respectively, and by the system 300 represented by the FIG. 3.

The modeler based policy configurator and simulator techniques presented herein and above are particular well suited for a Lightweight Directory Access Protocol (LDAP) proxy. This LDAP proxy implementation is shown via the screen shots of the FIGS. 4-7. The FIGS. 4-7 show a variety of information, such as: 1) gives a GUI for a user to configure and simulate complex policies, 2) adds/removes graph nodes and relationships between nodes (connections between nodes), 3) gives the user a complete picture of the whole directory configuration for a network in the form of graph nodes and graph connections (relationships) within a single modular-based graphical editor where the relationship and flow of controls are represented by connections, 4) lets users configure any section (part or portion of the configuration) or subsection or relationships just by clicking on the graph node, which pops up respective configuration dialog, 5) permits the modeler to arrange graph nodes and connections into appropriate stages, therefore the user is not confused with what is to come first or last, 6) allows zooming-out of a graph node when activated (double clicked) to show all its subsection nodes, so the user can also configure the subsections by activating (double clicking) on the subsection nodes, 7) permits the user to activate (double click) on a respective policy and configure these activated policies via pop-up configuration dialogues.

In addition, the user can simulate and test policies and configuration in one of two manners. Firstly, by providing sample data and starting a simulation operation to get results in the modeler (GUI as presented above) to show failures and successes. Secondly, by connecting live to an LDAP proxy server and passing the configuration for the policies in order to get the results back that are then represented in the modeler (GUI as described above).

The below description describes the process of how the policy configurations are modeled and represented into the graph nodes and relationships.

Figure 4:
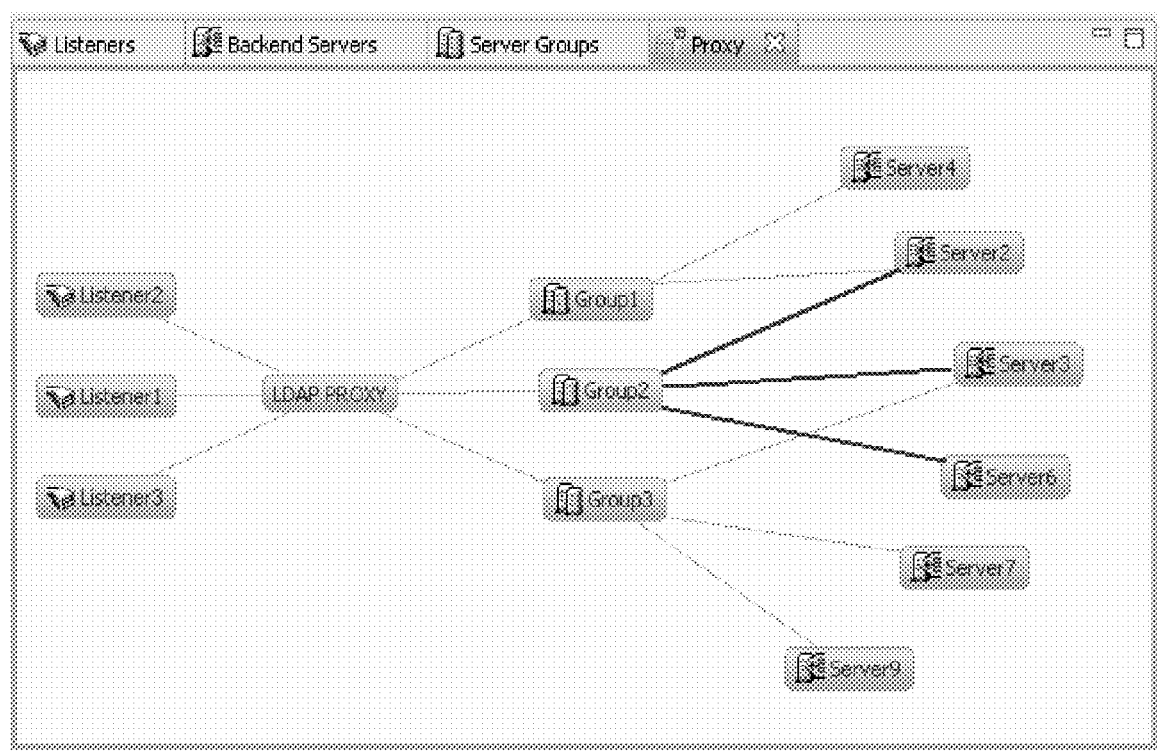
FIGS. 4-7 depict example screen shots of a Graphical User Interface (GUI) manipulated, processed, and used by the methods represented by the FIGS. 1 and 2, and by the system represented by the FIG. 3.

The FIG. 4 shows: 1) that the user can click on the Listener, Group, Server and invoke the configuration dialog and start editing the configuration; 2) that the user can know the relationships just by clicking on any node, with highlighting of all the connection lines (relationships) that are related with the current node; 3) that the changes done in the modeler (GUI) and are reflected in the configuration, represented in eXtensible Markup Language (XML).

Now the configuration policies are discussed.

Policies are set for the LDAP Proxy Server, by double-clicking on the "LDAP PROXY" Graph Node. The Graph Node changes its appearance (User Interface (UI) composite) with the below shown in the FIG. 5, where each node has its child nodes, which usually represent the sub-sections (individual policies). Each policy can be configured by clicking on the icons (sub nodes, e.g. A, B, C, D. are individual policies), which would open a configuration dialog. Once done with the policies, the user can double click on the graph node again, which brings the GUI back to the original state.

Simulation policies are now discussed. The user can start simulating the policies by sampling a request object with appropriate informational values or configuration setting values. The simulator engine consumes the request object and parses against the policies and the result and routing is depicted on the Modeler Graphical Editor (GUI) as shown below in the FIG. 6. The green lines indicate the pass and routing as well.

Figure 7:
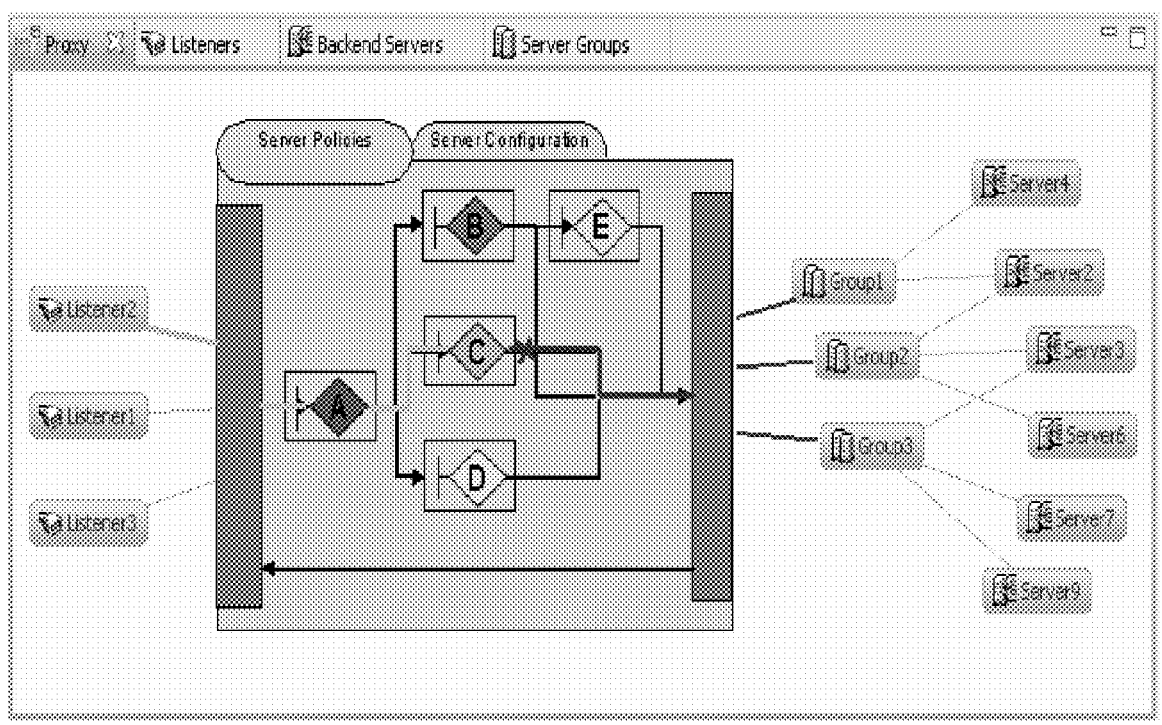

In case of Policy failure or Error, the Modeler Editor (GUI) will look as shown in the FIG. 7. The red lines and cross mark indicates the failure.

Figure 5:
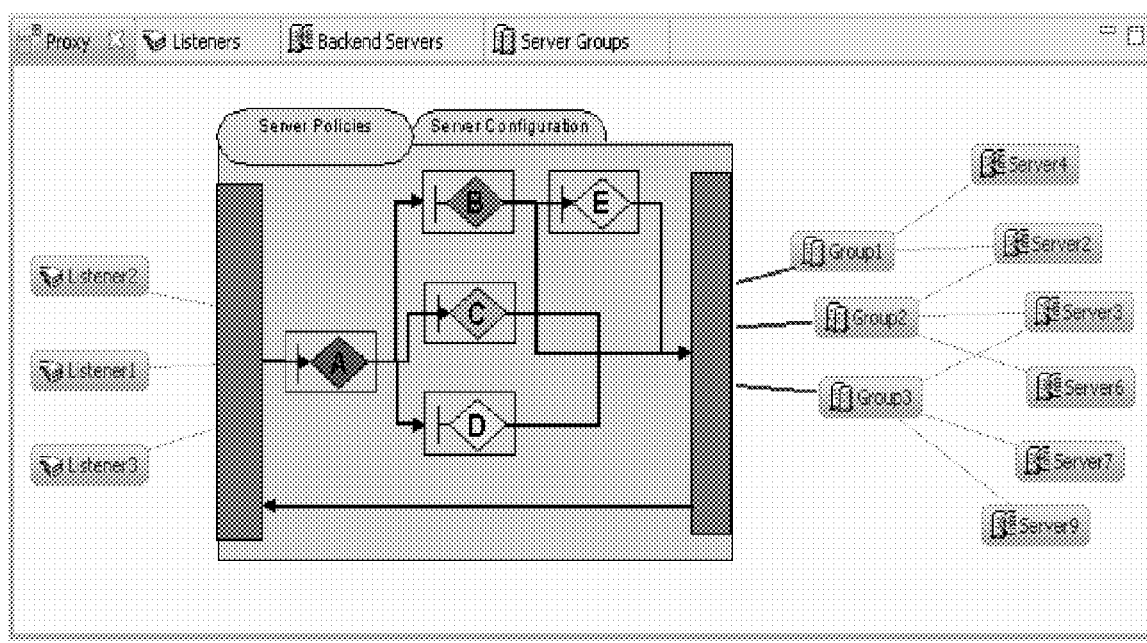

The techniques presented herein provide a variety of novell things such as: 1) representing a whole network configuration in a single editor, modeler, or GUI (as discussed above with reference to the FIGS. 1-3); 2) extending the graph node when double-clicked, it changes to a well formed UI container to show all its child nodes (e.g., policies), refer to the FIG. 5.

Figure 6:
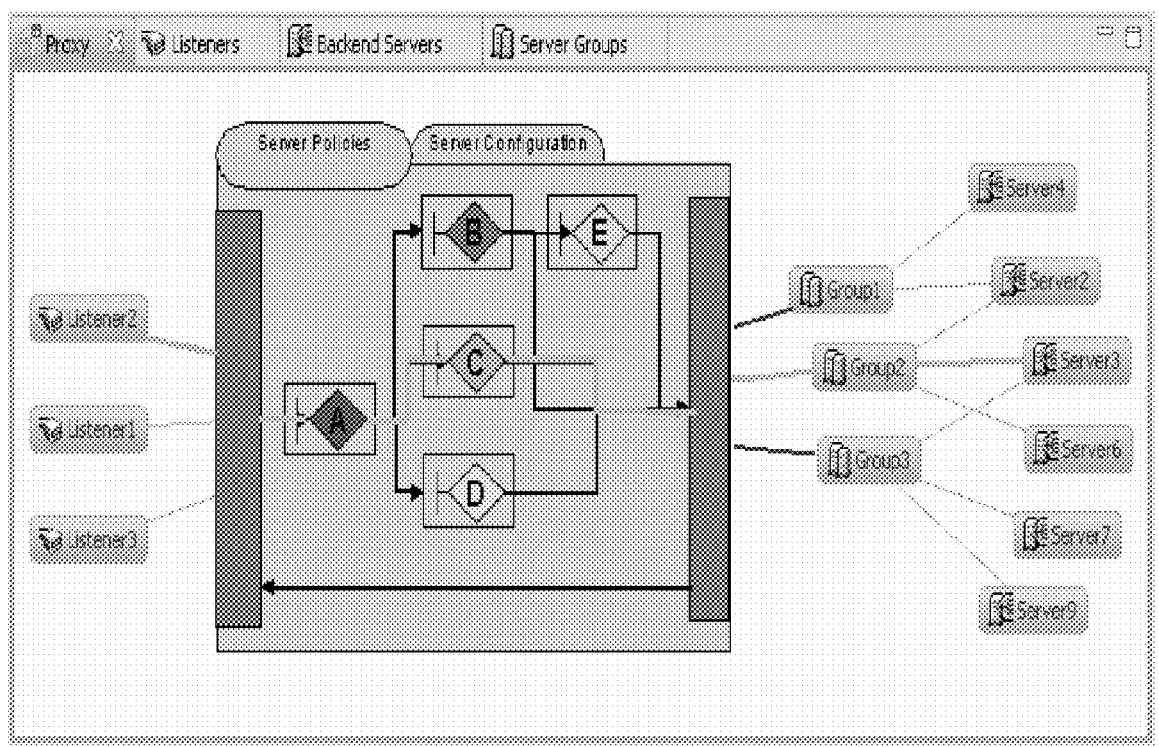

The techniques presented herein permit policy configuration and simulation within a single GUI or Modeler Editor as shown in the FIGS. 6-7.

Additionally, the techniques can be used for any configuration, modeling, monitoring, and/or simulation environment and not just directory-based environments or LDAP-based environments. The techniques and interfaces allow for custom configuration and simulation on any sort of user-defined policy.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method to execute on a processor, implemented and residing in a non-transitory computer-readable storage medium and the processor configured to perform the method comprising:
   acquiring, by the processor, an activation of a selected network resource from a user within a graphical user interface (GUI) that depicts the activated selected network resource along with other network resources of a network;
   receiving, by the processor, a selection within the GUI from the user, the selection identifying the network resource, which is depicted as a node within the GUI;
   altering, by the processor, a presentation of the GUI to show a path of connections from the selected network resource to other network resources connected in the path with the selected network resource;
   presenting, by the processor, a new presentation showing policies and policy relationships for the activated network resource as connections between the activated network resource and the other network resources, each connection defining a relationship, and each relationship defining connection details between the activated network resource and the other network resources and attributes for the connection details;
   obtaining, by the processor, from a user an activation of a select policy within the GUI, the policies presented within the new presentation as having interconnections to one another and related to the activated selected network resource;
   showing, by the processor, a configuration dialogue to the user to alter configuration settings for the activated select policy;
   making, by the processor, changes to the configuration settings in response to values supplied by the user in the configuration dialogue; and
   simulating, by the processor, the changes to the activated selected policy via the values within the network in response to direction within the GUI supplied by the user.

2. The method of claim 1, wherein receiving further includes identifying the selection from the selected network resource as a single-click made on the node within the GUI by the user.

3. The method of claim 1, wherein acquiring further includes identifying the activation of the selected network resource via a double-click made on a node representing the selected network resource within the GUI.

4. The method of claim 1, wherein simulating further includes presenting results from simulating the changes.

5. The method of claim 4, wherein simulating further includes identifying some relationships in red indicating that errors occurred when simulating the changes within the network.

6. The method of claim 4, wherein simulating further includes identifying some relationships in green indicating success occurred when simulating the changes within the network.

7. A policy configuration and simulation system implemented on one or more processors, comprising:
   one or more processors having a configurator implemented in a non-transitory computer-readable storage medium and to process on the one or more of the processors of a network; and
   the one or more processors also having a simulator implemented in a non-transitory computer-readable storage medium and to process on the one or more of the processors of the network;
   the configurator interacts with one or more screens of a graphical user interface (GUI) accessed by a user and the configurator is configured to accept value changes for configuration settings of policies graphically presented in the GUI, the configurator is also configured to provide the value changes to the simulator and the simulator is configured to process the value changes and present results of those value changes to the user within the GUI, the configuration settings of the policies shown as connection between resources, each connection defining a relationship and each relationship defining connection details between the resources and attributes for the connection details;
   wherein the configurator is further configured to be activated from a dialogue box after a user selects a particular policy for a particular network resource to alter, to enforce security against the value changes to ensure the user has proper access rights to make the value changes provided by the user, and to provide a listing of acceptable values for the user to select when providing the value changes.

8. The system of claim 7, wherein the simulator is configured to alter presentations within the GUI to depict the results for the user.

9. The system of claim 8, wherein the simulator is further configured to uniquely provide visual cues where results fail and succeed within the presentations.

* * * * *